US011943259B2

(12) United States Patent
Kurrasch et al.

(10) Patent No.: US 11,943,259 B2
(45) Date of Patent: Mar. 26, 2024

(54) SYSTEM AND METHOD FOR SECURITY MANAGEMENT OF APPLICATION INFORMATION

(71) Applicant: Bank of America Corporation, Charlotte, NC (US)

(72) Inventors: Peter G. Kurrasch, Palatine, IL (US); Nathan A. Dalpini, Lincolnville, ME (US)

(73) Assignee: Bank of America Corporation, Charlotte, NC (US)

( * ) Notice: Subject to any disclaimer, the term of this patent is extended or adjusted under 35 U.S.C. 154(b) by 433 days.

(21) Appl. No.: 17/448,374

(22) Filed: Sep. 22, 2021

(65) Prior Publication Data

US 2023/0093379 A1 Mar. 23, 2023

(51) Int. Cl.
*H04L 9/40* (2022.01)
(52) U.S. Cl.
CPC .......... *H04L 63/20* (2013.01); *H04L 63/0876* (2013.01); *H04L 63/10* (2013.01); *H04L 63/14* (2013.01)
(58) Field of Classification Search
CPC ..... H04L 63/20; H04L 63/0876; H04L 63/14; H04L 634/0227; H04L 63/1425
See application file for complete search history.

(56) References Cited

U.S. PATENT DOCUMENTS 7,428,509 B2 9/2008 Klebanoff
7,684,809 B2 3/2010 Niedermeyer
8,296,232 B2 10/2012 Tullis et al.
8,458,071 B2 6/2013 Martin et al.
8,473,415 B2 6/2013 Siegel et al.
8,516,377 B2 8/2013 Dixon et al.
8,600,873 B2 12/2013 Fisher
9,230,280 B1 1/2016 Maag et al.
(Continued)

FOREIGN PATENT DOCUMENTS

WO WO-2007041709 A1 * 4/2007 ........... G06Q 10/067

OTHER PUBLICATIONS

K. Randhawa, C. K. Loo, M. Seera, C. P. Lim and A. K. Nandi, "Credit Card Fraud Detection Using AdaBoost and Majority Voting," in IEEE Access, vol. 6, pp. 14277-14284, 2018, doi: 10.1109/ACCESS.2018.2806420. (Year: 2018).*

(Continued)

*Primary Examiner* — Kaveh Abrishamkar (57) ABSTRACT

An apparatus for security management of application information comprises a processor operable to receive the application information associated with a first entity and to receive entity device information for a first entity device associated with the first entity. The processor is operable to determine that a portion of data fields of the application information associated with the first entity corresponds to a portion of data fields of entity account data associated with a second entity and to determine that a portion of the entity device information associated with the first entity device corresponds to a portion of the entity device information associated with a second entity device that is associated with the second entity. The processor is further operable to determine that the first entity is associated with suspicious indicators, wherein suspicious indicators signal that there is suspicious activity associated with the first entity.

20 Claims, 4 Drawing Sheets

(56) References Cited

U.S. PATENT DOCUMENTS

| | | | |
|---|---|---|---|
| 9,892,293 B1 | 2/2018 | Wade et al. | |
| 9,972,001 B2 | 5/2018 | Murphy et al. | |
| 9,990,631 B2 | 6/2018 | Eisen | |
| 10,089,683 B2 | 10/2018 | Dominguez | |
| 10,127,409 B1 | 11/2018 | Wade et al. | |
| 10,460,382 B2 | 10/2019 | Dominguez | |
| 10,482,398 B2 | 11/2019 | Hammad | |
| 10,586,227 B2 | 3/2020 | Makhdumi et al. | |
| 10,586,234 B2 | 3/2020 | Mueller | |
| 10,970,777 B2 | 4/2021 | Altman et al. | |
| 11,811,778 B2 * | 11/2023 | Kurrasch | H04L 63/107 |
| 2002/0099649 A1 * | 7/2002 | Lee | G06Q 20/4016 |
| | | | 705/38 |
| 2012/0310702 A1 | 12/2012 | Paulsen et al. | |
| 2013/0041821 A1 | 2/2013 | Kingston et al. | |
| 2013/0179215 A1 | 7/2013 | Foster et al. | |
| 2015/0294339 A1 | 10/2015 | Vargas et al. | |
| 2017/0004502 A1 * | 1/2017 | Quentin | G06Q 20/322 |
| 2017/0178134 A1 * | 6/2017 | Senci | G06Q 20/4016 |
| 2017/0243221 A1 | 8/2017 | Gill et al. | |
| 2018/0121922 A1 * | 5/2018 | Zoldi | G06Q 20/4016 |
| 2019/0213498 A1 | 7/2019 | Adjaoute | |
| 2020/0019964 A1 * | 1/2020 | Miller | G06Q 20/38215 |
| 2020/0053560 A1 | 2/2020 | Lopez | |

OTHER PUBLICATIONS

Credit Card Fraud detection (Year: 2018).*

Kurrasch, P. G. et al., "System and Method for Security Management of a Plurality of Invalid Interactions," U.S. Appl. No. 17/448,381, filed Sep. 22, 2021, 41 pages.

* cited by examiner

SYSTEM AND METHOD FOR SECURITY MANAGEMENT OF APPLICATION INFORMATION

TECHNICAL FIELD

The present disclosure relates generally to determining suspicious activity by an entity device. More particularly, in certain embodiments, the present disclosure is related to a system and method for security management of application information.

BACKGROUND

An entity conducting an interaction with one or more users can have opportunities to engage in suspicious activity. Detection of such suspicious activity has focused on high-value interactions or a large volume of interactions.

SUMMARY

Previous technology used for detecting suspicious activity suffers from disadvantages. For example, this disclosure recognizes that information associated with a given entity, such as an entity category code, may be intercepted and used by another entity for operations within a particular organization. This can result in compromised network security for the organization wherein there is unauthorized access by one entity of information associated with another entity. In another example, conventional filtering processes generally search for higher-value interactions or a high volume of interactions to determine suspicious activity by an entity. In this example, the conventional filtering processes are limited by computer resources and bandwidth. Previous technology lacks the ability to detect a potentially security-compromising event, such as the interception and utilization by one entity of information associated with another entity. Previous technology also lacks the ability to detect interactions that are invalid when the value of the interactions is lower than a designated value set by conventional filtering processes or when there is a lower volume of interactions.

Certain embodiments of this disclosure provide unique technical solutions to the technical problems identified above. In particular, this disclosure provides a practical application of a system for security management of application information and a system for security management of a plurality of invalid interactions. For example, the disclosed system provides several technical advantages, which include: 1) technology for determining that information submitted by a first entity corresponds to information associated with a second entity, wherein such a determination can improve network security by inhibiting operations conducted by the first entity; 2) technology for determining that a number of instances of a plurality of interactions that are invalid exceeds a threshold after determining that each interaction comprises a lower value than an average value or that there is a lower volume of interactions, wherein such a determination requires detecting fewer interactions thereby conserving computer resources and making usage more efficient; and 3) technology for conducting an authorization session with a first entity device as a means for redundancy to verify that the network security is not compromised.

For example, the disclosed system may comprise a server operable to receive an online form or application comprising application information from a first entity via a first entity device, such as a computer. In this example, the application information submitted by the first entity may comprise an entity name, physical address, domain name, or an entity category code unique to a second entity. The server may be operable to compare the application information submitted by the first entity to the stored entity account data for one or more other entities. For example, the application information may list "Company Y" and "7300" as the entity name and entity category code, respectively, wherein that entity name and entity category code are associated with the second entity and not with the first entity. The entity name and entity category code of the first entity may be "Company X" and "7350", respectively, but the first entity may be attempting to onboard, or establish a profile or account, with the server of the second entity in order to operate as or in association with the second entity. The server may be operable to identify this action as suspicious activity, conduct an authorization session with the first entity device, and reject or inhibit further operations with the first entity. Network security may be improved by mitigating this initial suspicious activity by a first entity through identification of a potentially security-compromising event and conducting an authorization session to verify the action of the first entity.

In certain embodiments, the server may be operable to determine that the second entity is authorized to act on behalf of the first entity, but that the second entity performs other unauthorized activities. Upon verification, the server may monitor further actions and operations of the second entity. In these embodiments, an initial indicator of suspicious activity may be when a given entity that has an existing profile or account with the server attempts to create an additional profile or account with the server as another entity. Suspicious activity may be attempted to be conducted through the additional profile or account rather than through the entity's existing profile or account. After identifying the second entity as already associated with an existing profile or account, the server may be operable to monitor the second entity based on the attempt to create an additional profile or account. In these embodiments, the server may monitor an Internet Protocol (IP) address, cookies, domain, log-in frequency, information associated with one or more interactions with users (for example, credit card transactions), digital footprint, and any combinations thereof that are associated with the second entity for suspicious activity. If the server determines that there is suspicious activity, the server may be operable to inhibit further actions or operations by the second entity.

The server may be further operable to receive a plurality of interactions from the first entity device associated with one or more users (for example, credit card transactions). The server may be operable to determine whether a number of the received plurality of interactions are invalid when each of the plurality of interactions is lower than a threshold value and lower than a threshold volume. The server may compare each interaction to a threshold value of an interaction and a threshold volume received by the server. For example, the server may receive one hundred interactions processed by the first entity device in a transmission, each interaction comprising a value of one hundred dollars. In this example, a threshold value of each interaction received by the server may be one thousand dollars, and the threshold volume of interactions received by the server in a single transmission may be five hundred interactions. As the value of each one of the received interactions by the first entity device is less than the threshold value and as the received volume is less than the threshold volume, the server may be operable to determine a number of the received plurality of interactions that are invalid (for example, an interaction conducted with a card that has been cancelled before the interaction or an interaction that has been disputed). In general, conventional filtering processes direct computer resources and bandwidth to monitoring for high-value interactions or a high volume of interactions rather than low-value interactions or a low volume of interactions. As a result, a plurality of interactions that are invalid may proceed through processing undetected under these parameters. The disclosed server may improve the usage of computer resources by identifying invalid interactions through systems and methods not previously utilized by conventional filtering processes.

As such, this disclosure may improve the function of computing systems used for security management of application information of a first entity and of a plurality of invalid interactions. The disclosed system may be integrated into a practical application of verifying that a first entity is not able to onboard and operate as a second entity. As such, an account of the second entity is kept secure from data modification through actions by the first entity.

The disclosed system may further be integrated into an additional practical application of improving underlying operations and security of computing systems tasked to oversee the accounts of one or more users. For example, by identifying a plurality of invalid interactions between the one or more users and a first entity device that are not typically identified through conventional filtering processes, the computer systems tasked to oversee the accounts of the one or more users are able to prevent suspicious activity from occurring on those accounts. In another example, the disclosed system may reduce processing, memory, and time resources for identifying which interactions are invalid.

Thus, the disclosed systems and methods as discussed herein provide a high degree of information security. For example, the server may limit or prevent access to certain information and/or services when a potentially security-compromising event is detected (for example, by the determination that the application information submitted by the first entity corresponds to entity account data associated with the second entity).

In an embodiment, an authorization apparatus for security management of application information comprises a memory, associated with a server, operable to store application information associated with a first entity and to store entity device information of a first entity device associated with the first entity. The authorization apparatus further comprises a processor, associated with the server, operably coupled to the memory, configured to receive the application information associated with the first entity and to receive the entity device information for the first entity device. The processor is further operable to transmit the received application information and the received entity device information to the memory for storage and to determine that a portion of data fields of the application information associated with the first entity corresponds to a portion of data fields of entity account data associated with a second entity. In response to determining that the portion of data fields of the application information associated with the first entity corresponds to the portion of data fields of the entity account data associated with the second entity, the processor is further operable to determine that a portion of the entity device information associated with the first entity device corresponds to a portion of the entity device information associated with a second entity device that is associated with the second entity. In response to determining that the portion of the entity device information associated with the first entity device corresponds to the portion of the entity device information associated with the second entity device, the processor is further operable to determine that the first entity is associated with suspicious indicators, wherein suspicious indicators comprise a category within data classification utilized by the authorization apparatus to categorize received data by the processor, wherein suspicious indicators signal that there is suspicious activity associated with the first entity.

In another embodiment, an authorization apparatus for security management of a plurality of interactions comprises a memory, associated with a server, operable to store interaction information associated with one of one or more users and a first entity and to store entity account data for a plurality of entities. The authorization apparatus further comprises a processor, associated with the server, operably coupled to the memory, configured to receive the plurality of interactions, each interaction comprising the interaction information associated with one of the one or more users and the first entity, and to determine a threshold value of the plurality of interactions and a threshold volume of the plurality of interactions for each one or more users received by the plurality of entities based on the stored entity account data. The processor is further operable to determine that a value of each of the received plurality of interactions has not exceeded the threshold value of the plurality of interactions, and in response to determining that a value of each of the received plurality of interactions has not exceeded the threshold value of the plurality of interactions, determine that the plurality of interactions has not exceeded the threshold volume of the plurality of interactions. The processor is further operable to determine a number of instances of the plurality of interactions that were invalid and to determine that the number of instances of the plurality of interactions that were invalid exceeds a threshold. In response to determining that the number of instances of the plurality of interactions that were invalid exceeds the threshold, the processor is further operable to determine that the first entity is associated with suspicious indicators, wherein suspicious indicators comprise a category within data classification utilized by the authorization apparatus to categorize received data by the processor, wherein suspicious indicators signal that there is unauthorized activity associated with the first entity.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
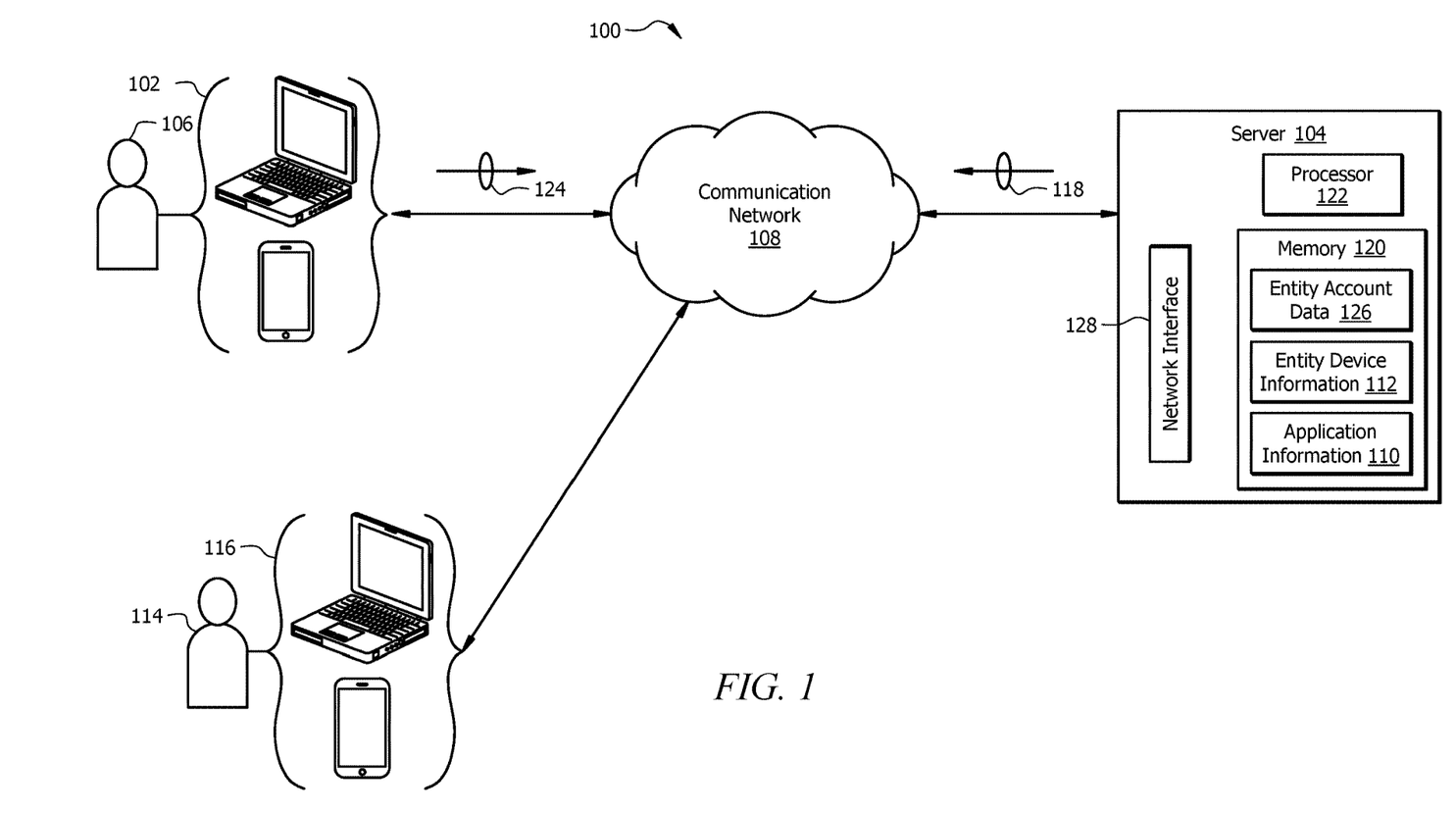
FIG. 1 is a schematic diagram of an example system for security management of application information.
Figure 2:
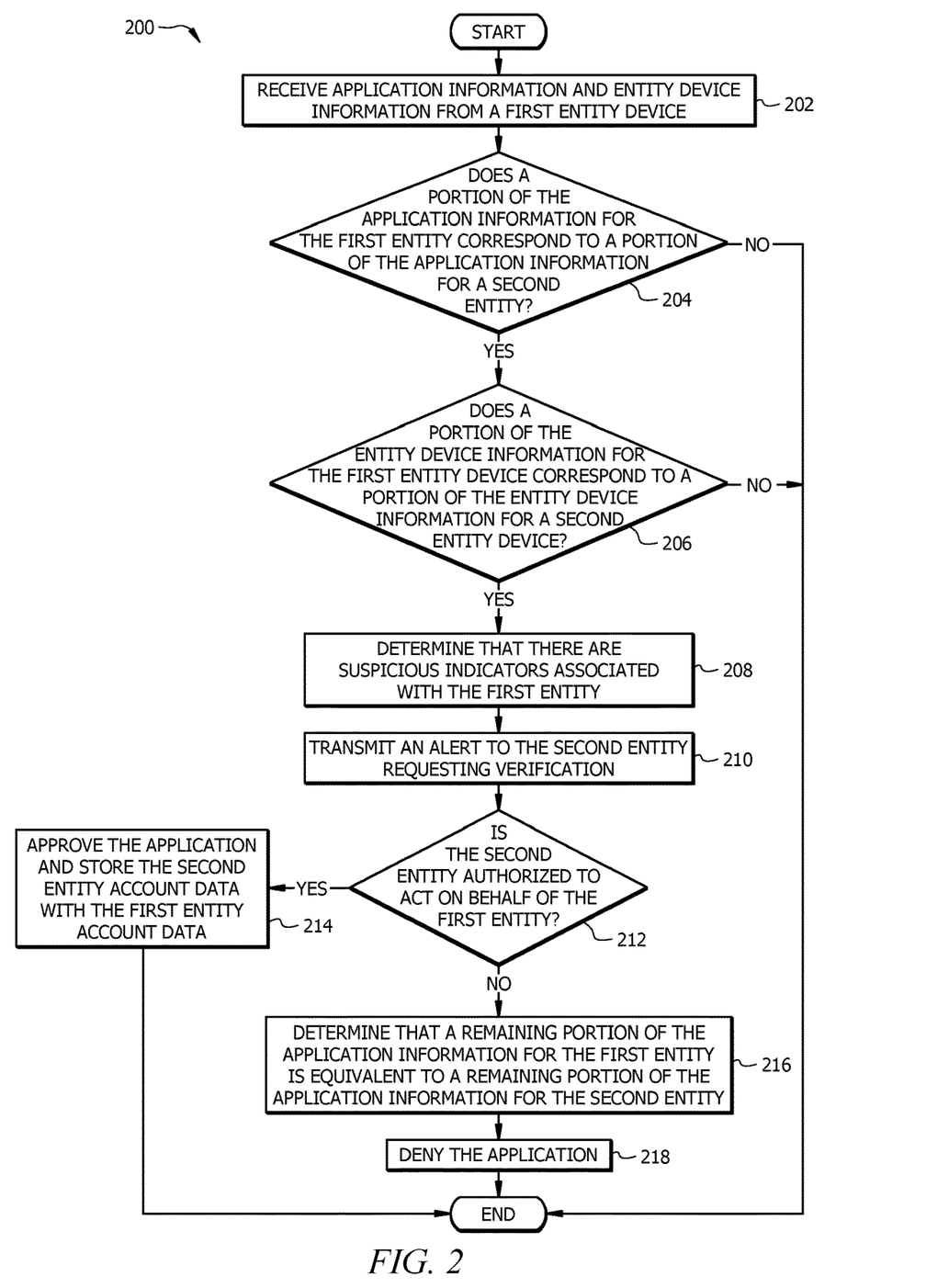
FIG. 2 is a flow diagram illustrating an example operation of the system of FIG. 1.
Figure 3:
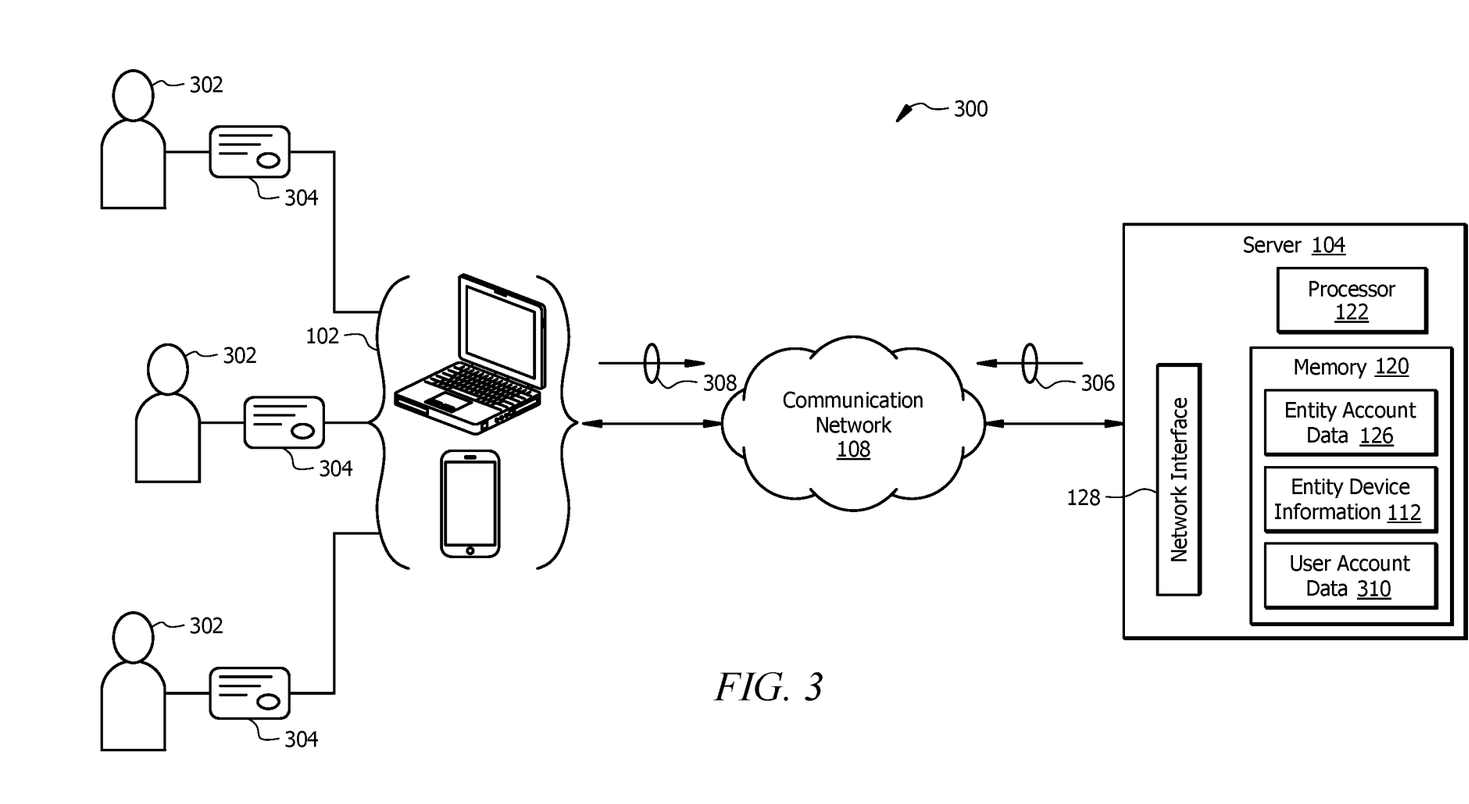
FIG. 3 is a schematic diagram of an example system for security management of a plurality of invalid interactions.
Figure 4:
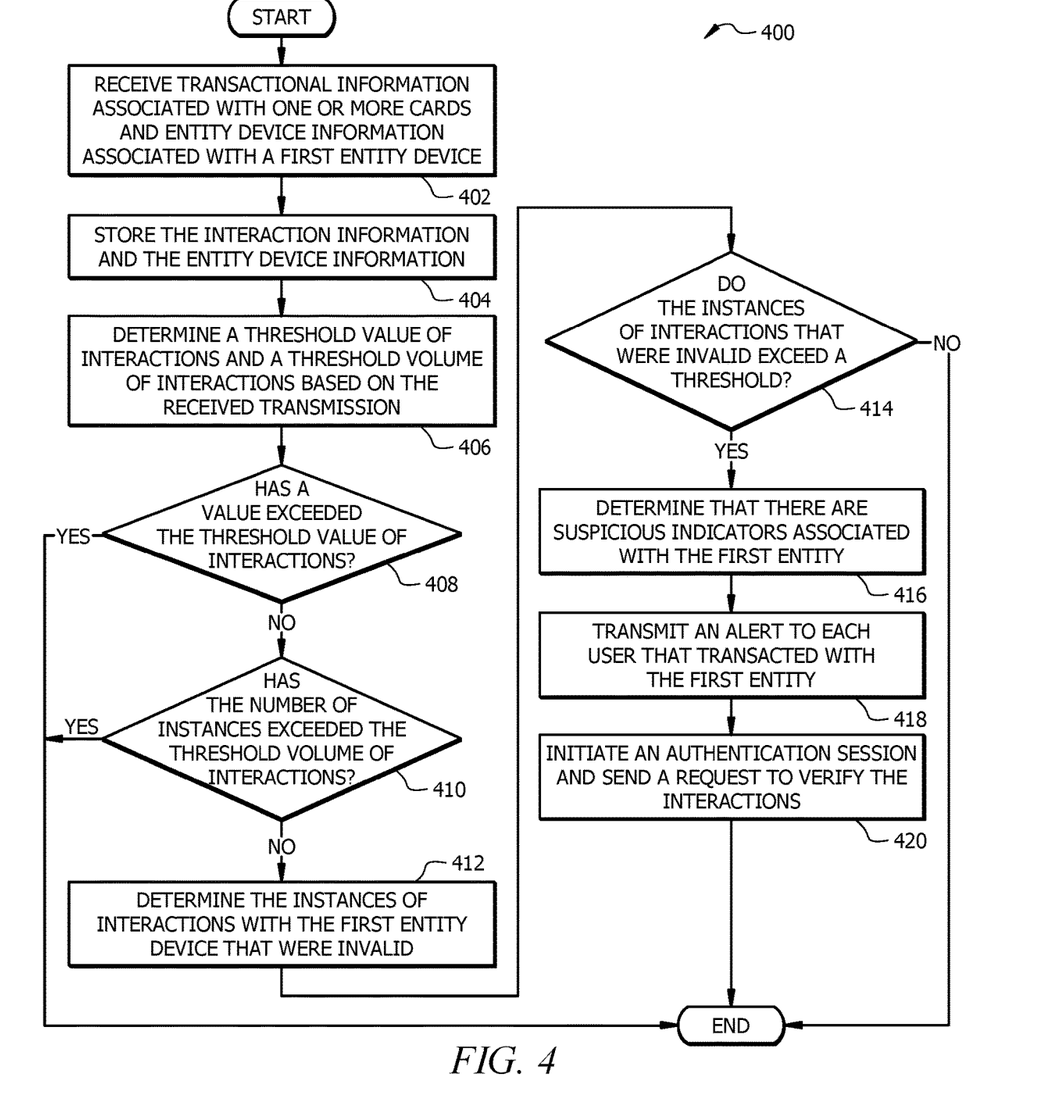
FIG. 4 is a flow diagram illustrating an example operation of the system of FIG. 3.

This disclosure provides solutions to the aforementioned and other problems of previous technology through security management of application information and of a plurality of invalid interactions. FIG. 1 is a schematic diagram of an example system for security management of application information. FIG. 2 is a flow diagram illustrating an example operation of the system of FIG. 1. FIG. 3 is a schematic diagram of an example system for security management of a plurality of invalid interactions. FIG. 4 is a flow diagram illustrating an example operation of the system of FIG. 3.

In a first particular embodiment described with reference to FIGS. 1 and 2, a system for security management is used to screen for merchant data previously stored in a database operated by a bank. For example, a first merchant may attempt to establish an account or profile with the bank. The bank may request the first merchant to provide specific data, such as the first merchant's name, physical address, domain name, merchant category code (MCC), and the like in order to establish the account or profile. This process may entail the first merchant inputting the specific data through an online form or application via a computer to be verified by the bank. The bank may receive the specific data as well as information associated with the first merchant's computer, such as an Internet Protocol (IP) address, cookies, and the like. In this example, the first merchant may not be conducting or may not plan to conduct legitimate transactions with customers. To conceal the illegitimate transactions, the first merchant may attempt to operate using the identity of a second merchant. The bank may already have information associated with the second merchant stored in the database, and the bank may be able to process the specific data provided by the first merchant as well as the information associated with the first merchant's computer and designate the first merchant as suspicious if there is at least partial overlap between the information provided by the first merchant and the information of the second merchant. In this way, the system disclosed herein is able to screen merchant data points maintained by the bank to identify any merchants that do not have a legitimate business, or are attempting to commit fraud.

In a second particular embodiment disclosed with reference to FIGS. 3 and 4, a system for security management is used to monitor and evaluate the processing of credit card transactions by the bank in order to identify and thwart any attempts by an entity to conduct a scam or other unauthorized business activity against bank clients. For example, a first merchant may be conducting illegitimate transactions with a plurality of customers. The bank may receive data associated with each credit card transaction between the first merchant and the plurality of customers in order to allocate or distribute funds between the first merchant and each of the plurality of customers. The first merchant may operate the scam in order to avoid detection by the bank through conventional filtering processes. Conventional filtering processes may generally search for higher-value credit card transactions or a high volume of credit card transactions to determine suspicious activity by a given merchant. In the present embodiment, the bank may be operable to compare the number of invalid credit card transactions occurring with the first merchant to a threshold value to determine that the first merchant is suspicious even when the first merchant is conducting lower-value credit card transactions or a lower volume of credit card transactions. By identifying the first merchant as suspicious, the system disclosed herein allows the bank to identify merchants that are not legitimate businesses, even those that may be bank clients, and thereby help prevent scams from continuing to be run on legitimate clients. This system can also help a bank prevent money laundering by merchants.

Example System for Security Management of Application Information

FIG. 1 illustrates a schematic diagram of an example system 100 for security management of application information submitted by a first entity 106, such as a merchant, to a server 104 of an organization, such as a bank. The system 100 may include a first entity device 102 associated with the first entity 106 and the server 104. The system 100 may be communicatively coupled to a communication network 108 and may be operable to transmit data between the first entity device 102 and the server 104 through the communication network 108. In general, the server 104 may perform an identification process with the first entity device 102. For example, the identification process may entail the first entity 106 inputting specific data through an online form or application via a computer (or similar device) to be verified by the server 104. In particular embodiments, this process utilizes application information 110 associated with the first entity 106 and entity device information 112 (for example, an IP address, browser cookies, and the like) associated with the first entity device 102 to verify that the first entity 106 is not operating as a second entity 114 associated with a second entity device 116, thereby reducing suspicious activity.

For example, in a particular embodiment, the first entity 106 may not be associated with the server 104, which is associated with a particular organization (for example, a bank or vendor), at a first time period. In this example, the first entity 106 may attempt to participate in suspicious activity with one or more users once associated with the server 104. In one or more embodiments, suspicious activity may be fraudulent activity. The server 104 may require application information 110 provided by an online application or form submitted by the first entity 106 in order to become associated with the first entity 106 (for example, to establish an account or profile for the first entity 106). Without limitations, the application information 110 may comprise an entity name, a physical address of operation, an entity category code, a domain name registered to the first entity 106, and any combinations thereof, where the entity category code may be used to classify an entity by the types of goods or services it provides. In certain embodiments, the first entity 106 may provide false or inaccurate information in order to facilitate the suspicious activity. In this particular example, the first entity 106 may submit an entity name of the second entity 114, an entity category code of the second entity 114, a domain name registered to the second entity 114, and any combinations thereof as the application information 110 in an attempt to become associated to the server 104 as the second entity 114. If the server 104 associates the first entity 106 as the second entity 114, the first entity 106 may conduct suspicious activity as the second entity 114. The present disclosure provides security management of the application information 110 received and may transmit an alert 118 to the second entity 114 indicating that the first entity 106 has submitted information associated with the second entity 114 as application information 110 for the first entity 106. The server 104 may further request verification from the second entity 114 and may inhibit association with the first entity 106.

The first entity device 102 may be any suitable device for initiating an interaction. For example, first entity device 102 may be a cash register, a tablet, a phone, a laptop, a personal computer, a payment terminal, a kiosk, etc. The first entity device 102 may be operable to receive information from a user and/or payment card when a purchase is requested. The first entity device 102 then may proceed to process the requested purchase. The first entity device 102 may include any appropriate device for communicating with components of system 100 over the communication network 108. As an example and not by way of limitation, first entity device 102 may include a computer, a laptop, a wireless or cellular telephone, an electronic notebook, a personal digital assistant, a tablet, or any other device capable of receiving, processing, storing, and/or communicating information with other components of system 100. This disclosure contemplates first entity device 102 being any appropriate device for sending and receiving communications over communication network 108. The first entity device 102 may also include a user interface, such as a display, a microphone, keypad, or other appropriate terminal equipment usable by a user and/or the first entity 106. In some embodiments, an application executed by first entity device 102 may perform the functions described herein. In one or more embodiments, the second entity device 116 may also be any suitable device for initiating an interaction. The second entity device 116 may be operable to perform similar functions as the first entity device 102 and may include similar components as discussed for the first entity device 102.

The first entity 106 and the second entity 114 may be clients of the same and/or different organizations. The organizations may enable first entity 106 and/or the second entity 114 to access their respective accounts, receive funds from one or more users, etc. For example, the organizations may generally facilitate the interactions of the first entity 106 and/or the second entity 114 (e.g., as a vendor). In a particular embodiment, first entity 106 and second entity 114 may be financial organizations, such as a bank.

The server 104 is generally a suitable server (e.g., including a physical server and/or virtual server) operable to store data in a memory 120 and/or provide access to application(s) or other services. The server 104 may be a backend server associated with a particular organization, such as a bank, that facilitates conducting interactions between entities and one or more users. Details of the operations of the server 104 are described in conjunction with FIG. 2. Memory 120 includes software instructions that, when executed by a processor 122, cause the server 104 to perform one or more functions described herein. For example, the server 104 may be a database operable to receive a transmission 124 from the first entity device 102 comprising an application associated with the first entity 106 and entity device information 112 associated with the first entity device 102, wherein the application comprises one or more data fields of application information 110. Once the server 104 receives the transmission 124 from the first entity device 102, the processor 122, associated with the server 104, may determine that a portion of one or more data fields of the application information 110 associated with the first entity 106 corresponds to a portion of data fields of entity account data 126 associated with the second entity 114 or with one or more additional entities.

For example, entity account data 126 associated with a plurality of entities (for example, second entity 114 and one or more additional entities) may be stored in the memory 120. In this example, the server 104 may not comprise entity account data for the first entity 106 at a first time period. The processor 122 may be communicatively coupled to the memory 120 and may access the memory 120 to determine whether a portion of one or more data fields of the application information 110 associated with the first entity 106 corresponds to a portion of data fields of entity account data 126 associated with the second entity 114 or with one or more additional entities. If there is a determination that a portion of one or more data fields of the application information 110 associated with the first entity 106 corresponds to a portion of data fields of entity account data 126 associated with the second entity 114 or with one or more additional entities, the first entity device 102 may be attempting to operate as that entity. The processor 122 may be operable to perform further functions to verify this determination, such as to: determine that a portion of the entity device information 112 associated with the first entity device 102 does not correspond to a portion of the entity device information 112 associated with the second entity device 116 that is associated with the second entity 114; and transmit the alert 118 to the second entity 114 indicating that the first entity 106 is engaging in suspicious activity and requesting verification.

Processor 122 comprises one or more processors operably coupled to the memory 120. The processor 122 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processor 122 may be a programmable logic device, a microcontroller, a microprocessor, or any suitable combination of the preceding. The one or more processors are configured to process data and may be implemented in hardware or software. For example, the processor 122 may be 8-bit, 16-bit, 32-bit, 64-bit, or of any other suitable architecture. The processor 122 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute software instructions. In this way, processor 122 may be a special-purpose computer designed to implement the functions disclosed herein. In an embodiment, the processor 122 is implemented using logic units, FPGAs, ASICs, DSPs, or any other suitable hardware. The processor 122 is configured to operate as described in FIGS. 1-2. For example, the processor 122 may be configured to perform the steps of method 200 as described in FIG. 2.

Memory 120 may be volatile or non-volatile and may comprise a read-only memory (ROM), random-access memory (RAM), ternary content-addressable memory (TCAM), dynamic random-access memory (DRAM), and static random-access memory (SRAM). Memory 120 may be implemented using one or more disks, tape drives, solid-state drives, and/or the like. Memory 120 is operable to store software instructions, account information 110, entity device information 112, entity account data 126, and/or any other data or instructions. The software instructions may comprise any suitable set of instructions, logic, rules, or code operable to execute the processor 122.

As illustrated, the server 104 may further comprise a network interface 128. Network interface 128 is configured to enable wired and/or wireless communications (e.g., via communication network 108). The network interface 128 is configured to communicate data between the server 104 and other devices (e.g., first entity device 102), databases, systems, or domain(s). For example, the network interface 128 may comprise a WIFI interface, a local area network (LAN) interface, a wide area network (WAN) interface, a modem, a switch, or a router. The processor 122 is configured to send and receive data using the network interface 128. The network interface 128 may be configured to use any suitable type of communication protocol as would be appreciated by one of ordinary skill in the art.

The communication network 108 may facilitate communication within the system 100. This disclosure contemplates the communication network 108 being any suitable network operable to facilitate communication between the first entity device 102 and the server 104. Communication network 108 may include any interconnecting system capable of transmitting audio, video, signals, data, messages, or any combination of the preceding. Communication network 108 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components. In other embodiments, system 100 may not have all of the components listed and/or may have other elements instead of, or in addition to, those listed above.

Example Operation of the System for Security Management of Application Information FIG. 2 is a flow diagram illustrating an example method 200 of the system 100 of FIG. 1. The method 200 may be implemented using the first entity device 102, the server 104, and the second entity device 116 of FIG. 1. The method 200 may begin at step 202 where the first entity 106 (referring to FIG. 1) may send the transmission 124 (referring to FIG. 1) from the first entity device 102 comprising an application associated with the first entity 106 and entity device information 112 (referring to FIG. 1) associated with the first entity device 102, wherein the application comprises one or more data fields of application information 110 (referring to FIG. 1). Without limitations, the entity device information 112 may comprise at least one of an interne protocol address used by the first entity device 102 and a browser cookie. Once the server 104 receives the transmission 124 from the first entity device 102, the processor 122 (referring to FIG. 1), associated with the server 104, may instruct the memory 120 (referring to FIG. 1) to store the received application information 110 and entity device information 112.

At step 204, the processor 122 of the server 104 may determine whether a portion of one or more data fields of the application information 110 associated with the first entity 106 corresponds to a portion of data fields of entity account data 126 (referring to FIG. 1) associated with the second entity 114 or with one or more additional entities. If there is a determination that a portion of one or more data fields of the application information 110 associated with the first entity 106 corresponds to a portion of data fields of entity account data 126 associated with the second entity 114 or with one or more additional entities, the method 200 proceeds to step 206. Otherwise, the method 200 proceeds to end.

At step 206, in response to determining that the portion of data fields of the application information 110 associated with the first entity 102 corresponds to the portion of data fields of the entity account data 126 associated with the second entity 114 or with one or more additional entities, the processor 122 of the server 104 may determine whether a portion of the entity device information 112 associated with the first entity device 102 corresponds to a portion of the entity device information 112 associated with the second entity device 116 (referring to FIG. 1) that is associated with the second entity 114. If there is a determination that a portion of the entity device information 112 associated with the first entity device 102 corresponds to a portion of the entity device information 112 associated with the second entity device 116, the method 200 proceeds to step 208. Otherwise, the method 200 proceeds to end.

At step 208, the processor 122 of the server 104 may determine that the first entity 106 is associated with suspicious indicators, wherein suspicious indicators may comprise a category within data classification utilized by the server 104 to categorize received data by the processor 122. In embodiments, one of the suspicious indicators may correspond to a determination that the portion of data fields of the application information 110 associated with the first entity 106 corresponds to the portion of data fields of the entity account data 126 associated with the second entity 114. Another one of the suspicious indicators may correspond to a determination that the portion of the entity device information 112 associated with the first entity device 102 corresponds to the portion of the entity device information 112 associated with the second entity device 116. For example, the processor 122 may determine that the first entity 106 is associated with suspicions indicators if the application information 110 associated with the first entity 106 comprises an equivalent domain name and/or entity category code as the entity account data 126 associated with the second entity 114. In these embodiments, suspicious indicators may signal to the server 104 that the first entity 106 may engage in suspicious activity. The server 104 may be further operational to verify whether suspicious activity has occurred.

At step 210, the processor 122 of the server 104 may transmit an alert 118 (referring to FIG.) to the second entity device 116 indicating that the server 104 received application information 110 from the first entity 106 that is associated with the second entity 114 and that the first entity 106 is associated with suspicious indicators. The processor 122 may be further operable to send a request to the second entity 114, via the second entity device 116, to verify that the second entity 114 was not authorized to act on behalf of the first entity 106.

At step 212, the processor 122 of the server 104 may receive a response signal from the second entity device 116 indicating whether or not the second entity 114 is authorized to act on behalf of the first entity 106. The processor 122 may be operable to determine whether the second entity 114 was authorized to act on behalf of the first entity 106. If the second entity 114 was authorized to act on behalf of the first entity 106, the method 200 proceeds to step 214. Otherwise, the method 200 proceeds to step 216.

At step 214, the processor 122 of the server 104 may be operable to approve the application comprising the application information 110 submitted by the first entity 106. The processor 122 may send a request to the memory 120 to store the received application information 110 as entity account data 126 associated with the first entity 106 after approving the application, wherein the entity account data 126 associated with the first entity 106 may include the entity account data 126 associated with the second entity 114. Upon verification that the second entity 114 is authorized to act on behalf of the first entity 106, the processor 122 of the server 104 may monitor further actions and operations of the second entity 114 to determine whether the second entity 114 is performing other unauthorized activities. In these embodiments, an indicator of suspicious activity may be when a given entity (for example, the second entity 114) that has an existing profile or account with the server 104 (for example, entity account data 126) attempts to create an additional profile or account with the server 104 as another entity (for example, the first entity 106). Suspicious activity may be attempted to be conducted through the additional profile or account rather than through the existing profile or account. After identifying the second entity 114 as associated with an existing profile or account (for example, entity account data 126 associated with the second entity 114), the processor 122 of the server 104 may be operable to monitor the second entity 114 based on the attempt to create an additional profile or account. In these embodiments, the processor 122 of the server 104 may monitor an Internet Protocol (IP) address, cookies, domain, log-in frequency, information associated with one or more interactions with users (for example, credit card transactions), digital footprint of the second entity device 116, and any combinations thereof that are associated with the second entity 114 for suspicious activity. If the processor 122 determines that there is suspicious activity, the processor 122 may be operable to inhibit further actions or operations by the second entity 114. The method 200 may then proceed to end.

With reference back to step 216, the processor 122 of the server 104 may send a request to the first entity device 102 to initiate an authentication session between the first entity device 102 and the server 104. In the authentication session, the server 104 may receive, from the first entity device 102, data associated with the first entity 106 that is not contained within the application information 110 associated with the first entity 106. Once the server 104 receives the data from the first entity 106, the authentication session may end. The processor 122 may be operable to compare the received data to entity account data 126 associated with the second entity 114 stored in the memory 120. The processor 122 may be further operable to compare a remaining portion of data fields of the application information 110 associated with the first entity 102 to a remaining portion of data fields of the entity account data 126 associated with the second entity 114. If the remaining portion of data fields of the application information 110 associated with the first entity 102 are equivalent to a remaining portion of data fields of the entity account data 126 associated with the second entity 114 and the received data from the first entity 106 does not match the entity account data 126 associated with the second entity 114 stored in the memory 120, the processor 122 may determine that the first entity 106 is attempting suspicious activity.

At step 218, in response to a determination that the first entity 106 is attempting suspicious activity, the processor 122 of the server 104 may be operable to deny the application comprising the application information 110 submitted by the first entity 106. The method 200 then proceeds to end.

Example System for Security Management of a Plurality of Invalid Interactions

FIG. 3 illustrates a schematic diagram of an example system 300 for security management of a plurality of interactions, such as credit card transactions, between an entity, such as a merchant, and an organization, such as a bank. The system 300 may include the first entity device 102, the server 104, and the communication network 108, as previously described with reference to FIG. 1. The system 300 may be communicatively coupled to the communication network 108 and may be operable to transmit data between the first entity device 102 and the server 104 through the communication network 108. In general, the server 104 may perform an authentication process with the first entity device 102. In particular embodiments, this process utilizes interaction information between the first entity device 102 and one or more users 302 to determine whether the first entity device 102 is engaging in or associated with suspicious activity.

For example, in a particular embodiment, one or more users 302 may make purchases using the first entity device 102. The one or more users 302 may present a payment card 304, individually associated with each one of the one or more users 302, to first entity device 102 to make the purchase, wherein each payment card 304 provides information to authenticate the user 302. In conventional processes, once this information is used to identify and authenticate one or more users 302, the purchase is granted. However, identification and authentication based on this information may not be very reliable. For example, the information on the card is static and does not indicate whether the one or more users 302 is the user identified by the information on payment card 304. In this example, suspicious activity may ensue if the payment card 304 of one of the one or more users 302, that is not authenticated, is used to complete a purchase or interaction with a large value and/or used to complete a greater number of purchases or interactions than the user 302 would typically complete. For example, suspicious activity may occur where the payment card 304 is used two hundred times within a day where, in contrast, the average number of payment card 304 transactions in which that user 302 normally uses the payment card 304 for an interaction is two times per day. Detecting the anomaly between a high volume of payment card 304 transactions and the normal number of payment card 304 transactions may indicate suspicious activity. The present disclosure provides security management within the system 300 using information, such as interaction information between the first entity device 102 and the one or more users 302, to determine suspicious activity by the first entity device 102. The server 104 may be operable to monitor the values and volume of a plurality of interactions for one or more users 302 and transmit an alert 306 to the one or more users indicating when there is a determination of suspicious activity by an entity (for example, the first entity 106 in FIG. 1).

As previously described, the first entity device 102 may be any suitable device for initiating an interaction. For example, first entity device 102 may be a cash register, a tablet, a phone, a laptop, a personal computer, a payment terminal, a kiosk, etc. associated with a first entity 106, such as a merchant. The first entity device 102 may be operable to receive information from one or more users 302 via the payment card 304 when a purchase is requested. The first entity device 102 may then proceed to process the requested purchase. The first entity device 102 may include any appropriate device for communicating with components of system 100 over the communication network 108. As an example and not by way of limitation, first entity device 102 may include a computer, a laptop, a wireless or cellular telephone, an electronic notebook, a personal digital assistant, a tablet, or any other device capable of receiving, processing, storing, and/or communicating information with other components of system 300. This disclosure contemplates first entity device 102 being any appropriate device for sending and receiving communications over communication network 108. The first entity device 102 may also include a user interface, such as a display, a microphone, keypad, or other appropriate terminal equipment usable by the one or more users 302 and/or an entity associated with the first entity device 102 (for example, the first entity 106 in FIG. 1). In some embodiments, an application executed by first entity device 102 may perform the functions described herein.

Payment card 304 may be any suitable card presented by the one or more users 302 to initiate and complete a purchase, such as for example, a credit or debit card. Payment card 304 may include information that is used to identify and authenticate the one or more users 302. For example, payment card 304 may include a name of customer 102 and/or a unique card number.

The server 104 is generally a suitable server (e.g., including a physical server and/or virtual server) operable to store data in the memory 120 and/or provide access to application(s) or other services. The server 104 may be a backend server associated with a particular organization, such as a bank in one embodiment, that facilitates conducting interactions between entities and one or more users. Details of the operations of the server 104 of system 300 are described in conjunction with FIG. 4. Memory 120 includes software instructions that, when executed by the processor 122, cause the server 104 to perform one or more functions described herein. The processor 122 may be communicatively coupled to the memory 120 and may access the memory 120. For example, the server 104 may be a database operable to receive a transmission 308 from the first entity device 102 comprising a plurality of interactions between the first entity device 102 and one or more users 302, wherein each one of the plurality of interactions comprises interaction information between the first entity device 102 and that one of the one or more users 302. Once the server 104 receives the transmission 308 from the first entity device 102, the processor 122, associated with the server 104, may determine a threshold value of the plurality of interactions and a threshold volume of the plurality of interactions for each one or more users 302. The processor 122 may be further operable to determine whether one of the values of the plurality of interactions is greater than the determined threshold value; whether the volume of interactions for one of the one or more users 302 is greater than the determined threshold volume; and whether the first entity device 102 is engaging in or associated with suspicious activity based on these determinations.

Processor 122 comprises one or more processors operably coupled to the memory 120. The processor 122 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processor 122 may be a programmable logic device, a microcontroller, a microprocessor, or any suitable combination of the preceding. The one or more processors are configured to process data and may be implemented in hardware or software. For example, the processor 122 may be 8-bit, 16-bit, 32-bit, 64-bit, or of any other suitable architecture. The processor 122 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute software instructions. In this way, processor 122 may be a special-purpose computer designed to implement the functions disclosed herein. In an embodiment, the processor 122 is implemented using logic units, FPGAs, ASICs, DSPs, or any other suitable hardware. The processor 122 is configured to operate as described in FIGS. 3-4. For example, the processor 122 may be configured to perform the steps of method 400 as described in FIG. 4.

Memory 120 may be volatile or non-volatile and may comprise a read-only memory (ROM), random-access memory (RAM), ternary content-addressable memory (TCAM), dynamic random-access memory (DRAM), and static random-access memory (SRAM). Memory 120 may be implemented using one or more disks, tape drives, solid-state drives, and/or the like. Memory 120 is operable to store software instructions, entity device information 112, entity account data 126, user account data 310, and/or any other data or instructions. The software instructions may comprise any suitable set of instructions, logic, rules, or code operable to execute the processor 122.

As illustrated, the server 104 may further comprise the network interface 128. Network interface 128 is configured to enable wired and/or wireless communications (e.g., via communication network 108). The network interface 128 is configured to communicate data between the server 104 and other devices (e.g., first entity device 102), databases, systems, or domain(s). For example, the network interface 128 may comprise a WIFI interface, a local area network (LAN) interface, a wide area network (WAN) interface, a modem, a switch, or a router. The processor 122 is configured to send and receive data using the network interface 128. The network interface 128 may be configured to use any suitable type of communication protocol as would be appreciated by one of ordinary skill in the art.

The communication network 108 may facilitate communication within the system 100. This disclosure contemplates the communication network 108 being any suitable network operable to facilitate communication between the first entity device 102 and the server 104. Communication network 108 may include any interconnecting system capable of transmitting audio, video, signals, data, messages, or any combination of the preceding. Communication network 108 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components. In other embodiments, system 100 may not have all of the components listed and/or may have other elements instead of, or in addition to, those listed above.

Example Operation of the System for Security Management of a Plurality of Invalid Interactions FIG. 4 is a flow diagram illustrating an example method 400 of the system 300 of FIG. 3. The method 400 may be implemented using the first entity device 102 and the server 104 of FIG. 3. The method 400 may begin at step 402 where the transmission 308 (referring to FIG. 3) may be sent from the first entity device 102 to the server 104 comprising the plurality of interactions between the first entity device 102 and one or more users 302 (referring to FIG. 3), wherein each interaction comprises interaction information associated with one of the one or more users 302 and the first entity device 102. In embodiments, the interaction information may comprise at least a value of the interaction.

At step 404, once the server 104 receives the transmission 308 from the first entity device 102, the processor 122

(referring to FIG. 3), associated with the server 104, may instruct the memory 120 (referring to FIG. 3) of the server 104 to store the data provided by the received transmission 308. In embodiments, the memory 120 may be operable to store a portion of the interaction information as user account data 310 (referring to FIG. 3) for each of the one or more users 302. The memory 120 may be further operable to store a remaining portion of the interaction information as entity account data 126 that is associated with the first entity 106 (referring to FIG. 1) that is associated to the first entity device 102. The received transmission may further comprise entity device information 112 for the first entity device 102, and the memory 120 may be operable to store the entity device information 112 received from the transmission 308.

At step 406, the processor 122 of the server 104 may determine a threshold value of the plurality of interactions and a threshold volume of the plurality of interactions based on the interaction information from the received transmission 308.

At step 408, the processor 122 of the server 104 may determine whether a value of each one of the received plurality of interactions from the transmission 308 has exceeded the threshold value of the plurality of interactions. If there is a determination that a value of one of the received plurality of interactions from the transmission 308 has exceeded the threshold value of the plurality of interactions, the method 400 proceeds to end. Otherwise, the method 400 proceeds to step 410.

At step 410, in response to determining that a value of each of the received plurality of interactions has not exceeded the threshold value of the plurality of interactions, the processor 122 of the server 104 may determine whether the number of the plurality of interactions has exceeded the threshold volume of the plurality of interactions. If there is a determination that the number of the plurality of interactions has exceeded the threshold volume of the plurality of interactions, the method 400 proceeds to end. Otherwise, the method 400 proceeds to step 412.

At step 412, the processor 122 of the server 104 may determine a number of instances wherein one or more of the plurality of interactions were invalid. In embodiments, an interaction may be invalid wherein the payment card 304 (referring to FIG. 3) has been cancelled before the interaction, the interaction has been disputed, or combinations thereof. The memory 120 of the server 104 may be operable to store a threshold number of interactions that are invalid.

At step 414, the processor 122 of the server 104 may determine whether a number of instances wherein one or more of the plurality of interactions were invalid is greater than the threshold stored in the memory 120. For example, there may be eighty instances of interactions that were invalid, and the threshold may be fifty. If there is a determination that the number of instances wherein one or more of the plurality of interactions were invalid is not greater than the threshold stored in the memory 120, the method 400 proceeds to end. Otherwise, the method 400 proceeds to step 416.

At step 416, the processor 122 of the server 104 may determine that the first entity device 102 is associated with suspicious indicators. As described above with respect to FIG. 2, the suspicious indicators may comprise a category within data classification utilized by the server 104 to categorize received data by the processor 122. In embodiments, suspicious indicators may correspond to a determination that the values of the received plurality of interactions from the transmission 308 has not exceeded the threshold value of the plurality of interactions and to a determination that the number of the plurality of interactions has not exceeded the threshold volume of the plurality of interactions. Another one of the suspicious indicators may correspond to a determination that the number of instances wherein one or more of the plurality of interactions were invalid is greater than the threshold stored in the memory 120. For example, the processor 122 may determine that the first entity 106 is associated with suspicions indicators if there are eighty instances of interactions that were invalid, where the threshold is fifty, and the values of the received plurality of interactions from the transmission 308 has not exceeded the threshold value of the plurality of interactions and the number of the plurality of interactions has not exceeded the threshold volume of the plurality of interactions. In these embodiments, suspicious indicators may signal to the server 104 that the first entity 106 has engaged in suspicious activity with the one or more users 302. The server 104 may be further operational to verify whether suspicious activity has occurred.

At step 418, the processor 122 of the server 104 may transmit the alert 306 (referring to FIG. 3) to the one or more users 302 indicating that the server 104 received the plurality of interactions associated with the first entity device 102 and that the first entity device 102 is associated with suspicious indicators.

At step 420, the processor 122 of the server 104 may send a request to the first entity device 102 to initiate an authentication session between the first entity device 102 and the server 104. In the authentication session, the server 104 may receive, from the first entity device 102, entity device information 112 (referring to FIG. 3) associated with the first entity device 102. Once the server 104 receives the entity device information 112, the authentication session may end. The processor 122 may be operable to analyze the received entity device information 112 to determine whether the first entity 106, via the first entity device 102, has engaged in suspicious activity. The processor 122 may further be operable to send a request to each one of the one or more users 302 to verify that one of the plurality of interactions was authorized by that one of the one or more users 302 and receive a response signal indicating that the one of the plurality of interactions was or was not authorized by that one of the one or more users 302.

If the received response signal indicates that the one of the plurality of interactions was authorized, the processor 122 may send a request to the memory 120 to store the received interaction information in the user account data 310 for that one of the one or more users 302. If the received response signal indicates that the one of the plurality of interactions was not authorized, the processor 122 may be operable to determine a location of that one of the one or more users 302 and a location of the first entity device 102. In embodiments, the processor 122 may be configured to determine the location based, at least in part, on the received entity device information 112 from the first entity device 102 during the authentication session. The processor 122 may be operable to determine that the location of that one of the one or more users 302 is not located within a distance threshold from the location of the first entity device 102. For example, the processor 122 may determine that the first entity device 102 is associated with a physical storefront at a given location. In this example, one of the one or more users 302 may be at a location three hundred miles away from the location of the first entity device 102 at about the time of the interaction between that user 302 and the first entity device 102. In this example, the distance threshold between the first entity device 102 and one of the one or more users 302 may be twenty miles. As the distance between that one of the one or more user 302 is greater than the distance threshold, the processor 122 may determine that the one of the plurality of interactions that was not authorized by this user 302 is invalid. The processor 122 may be operable to inhibit interactions associated with the first entity device 102 from processing. The method 400 then proceeds to end.

While several embodiments have been provided in this disclosure, it should be understood that the disclosed system and method might be embodied in many other specific forms without departing from the spirit or scope of this disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of this disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. An authorization apparatus for security management of application information, comprising:
    a memory, associated with a server, operable to:
        store application information associated with a first entity; and
        store entity device information of a first entity device associated with the first entity; and
    a processor, associated with the server, operably coupled to the memory, configured to:
        receive the application information associated with the first entity;
        receive the entity device information for the first entity device;
        transmit the received application information and the received entity device information to the memory for storage;
        determine that a portion of data fields of the application information associated with the first entity corresponds to a portion of data fields of entity account data associated with a second entity;
        in response to determining that the portion of data fields of the application information associated with the first entity corresponds to the portion of data fields of the entity account data associated with the second entity, determine that a portion of the entity device information associated with the first entity device corresponds to a portion of the entity device information associated with a second entity device that is associated with the second entity; and
        in response to determining that the portion of the entity device information associated with the first entity device corresponds to the portion of the entity device information associated with the second entity device, determine that the first entity is associated with suspicious indicators, wherein suspicious indicators comprise a category within data classification utilized by the authorization apparatus to categorize received data by the processor, wherein suspicious indicators signal that there is suspicious activity associated with the first entity.

2. The authorization apparatus of claim 1, wherein the data fields of the application information comprise at least one of an entity name, an entity category code, and a domain name.

3. The authorization apparatus of claim 1, wherein the entity device information comprises at least one of an internet protocol address and a browser cookie.

4. The authorization apparatus of claim 1, wherein the processor associated with the server is further configured to:
    transmit an alert to the second entity device indicating that the server received application information that is associated with the second entity from the first entity device and that the first entity is associated with suspicious indicators; and
    send a request to the second entity device to verify that the second entity was not authorized to act on behalf of the first entity.

5. The authorization apparatus of claim 1, wherein the processor associated with the server is further configured to:
    send a request to the first entity device to initiate an authentication session between the first entity device and the server;
    receive, from the first entity device, data associated with the first entity that is not contained within the application information associated with the first entity during the authentication session; and
    compare the received data to entity account data associated with the second entity stored in the memory.

6. The authorization apparatus of claim 5, wherein the processor associated with the server is further configured to:
    in response to comparing the received data to entity account data associated with the second entity, determine that the first entity is the second entity;
    approve an application comprising the application information associated with the first entity; and
    send a request to the memory to store the entity account data associated with the first entity after approving the application, wherein the entity account data associated with the first entity includes the entity account data associated with the second entity.

7. The authorization apparatus of claim 5, wherein the processor associated with the server is further configured to:
    in response to comparing the received data to entity account data associated with the second entity, determine that the first entity is not the second entity;
    determine that a remaining portion of data fields of the application information associated with the first entity is equivalent to a remaining portion of data fields of the entity account data associated with the second entity; and
    reject an application comprising the application information associated with the first entity.

8. A method for security management of application information, comprising:
    receiving, by a server, the application information associated with a first entity;

receiving, by the server, entity device information for a first entity device associated with the first entity;

determining that a portion of data fields of the application information associated with the first entity corresponds to a portion of data fields of entity account data associated with a second entity;

in response to determining that the portion of data fields of the application information associated with the first entity corresponds to the portion of data fields of the entity account data associated with the second entity, determining that a portion of the entity device information associated with the first entity device corresponds to a portion of the entity device information associated with a second entity device that is associated with the second entity; and in response to determining that the portion of the entity device information associated with the first entity device corresponds to the portion of the entity device information associated with the second entity device, determine that the first entity is associated with suspicious indicators, wherein suspicious indicators comprise a category within data classification utilized by the server to categorize received data, wherein suspicious indicators signal that there is suspicious activity associated with the first entity.

9. The method of claim 8, wherein the data fields of the application information comprise at least one of an entity name, an entity category code, and a domain name.

10. The method of claim 8, wherein the entity device information comprises at least one of an internet protocol address and a browser cookie.

11. The method of claim 8, further comprising:
transmitting an alert to the second entity device indicating that the server received application information that is associated with the second entity from the first entity device and that the first entity is associated with suspicious indicators; and
sending a request to the second entity device to verify that the second entity was not authorized to act on behalf of the first entity.

12. The method of claim 8, further comprising:
sending a request to the first entity device to initiate an authentication session between the first entity device and the server;
receiving, from the first entity device, data associated with the first entity that is not contained within the application information associated with the first entity during the authentication session; and
comparing the received data to entity account data associated with the second entity.

13. The method of claim 12, further comprising:
in response to comparing the received data to entity account data associated with the second entity, determining that the first entity is the second entity;
approving an application comprising the application information associated with the first entity; and
storing the entity account data associated with the first entity after approving the application, wherein the entity account data associated with the first entity includes the entity account data associated with the second entity.

14. The method of claim 12, further comprising:
in response to comparing the received data to entity account data associated with the second entity, determining that the first entity is not the second entity;
determining that a remaining portion of data fields of the application information associated with the first entity is equivalent to a remaining portion of data fields of the entity account data associated with the second entity; and
rejecting an application comprising the application information associated with the first entity.

15. A non-transitory computer-readable medium comprising instructions that are configured, when executed by a processor of a server, to:
receive application information associated with a first entity;
receive entity device information for a first entity device associated with the first entity;
transmit the received application information and the received entity device information to a memory for storage, wherein the processor is communicatively coupled to the memory;
determine that a portion of data fields of the application information associated with the first entity corresponds to a portion of data fields of entity account data associated with a second entity;
in response to determining that the portion of data fields of the application information associated with the first entity corresponds to the portion of data fields of the entity account data associated with the second entity, determine that a portion of the entity device information associated with the first entity device corresponds to a portion of the entity device information associated with a second entity device that is associated with the second entity; and
in response to determining that the portion of the entity device information associated with the first entity device corresponds to the portion of the entity device information associated with the second entity device, determine that the first entity is associated with suspicious indicators, wherein suspicious indicators comprise a category within data classification utilized by the server to categorize received data by the processor, wherein suspicious indicators signal that there is suspicious activity associated with the first entity.

16. The non-transitory computer-readable medium of claim 15, wherein the data fields of the application information comprise at least one of an entity name, an entity category code, and a domain name, and wherein the entity device information comprises at least one of an internet protocol address and a browser cookie.

17. The non-transitory computer-readable medium of claim 15, wherein the instructions are further configured to:
transmit an alert to the second entity device indicating that the server received application information that is associated with the second entity from the first entity device and that the first entity is associated with suspicious indicators; and
send a request to the second entity device to verify that the second entity was not authorized to act on behalf of the first entity.

18. The non-transitory computer-readable medium of claim 15, wherein the instructions are further configured to:
send a request to the first entity device to initiate an authentication session between the first entity device and the server;
receive, from the first entity device, data associated with the first entity that is not contained within the application information associated with the first entity during the authentication session; and
compare the received data to entity account data associated with the second entity stored in the memory.

19. The non-transitory computer-readable medium of claim 18, wherein the instructions are further configured to:
- in response to comparing the received data to entity account data associated with the second entity, determine that the first entity is the second entity;
- approve an application comprising the application information associated with the first entity; and
- send a request to the memory to store the entity account data associated with the first entity after approving the application, wherein the entity account data associated with the first entity includes the entity account data associated with the second entity.

20. The non-transitory computer-readable medium of claim 18, wherein the instructions are further configured to:
- in response to comparing the received data to entity account data associated with the second entity, determine that the first entity is not the second entity;
- determine that a remaining portion of data fields of the application information associated with the first entity is equivalent to a remaining portion of data fields of the entity account data associated with the second entity; and
- reject an application comprising the application information associated with the first entity.

\* \* \* \* \*